US011988390B1

(12) United States Patent
Funk

(10) Patent No.: US 11,988,390 B1
(45) Date of Patent: *May 21, 2024

(54) BODY-MOUNTED HINGE ASSEMBLY COMPONENT

(71) Applicant: Electrolux Home Products, Inc., Charlotte, NC (US)

(72) Inventor: Gregory Funk, Nashville, TN (US)

(73) Assignee: Electrolux Home Products, Inc., Charlotte, NC (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/971,935

(22) Filed: Oct. 24, 2022

Related U.S. Application Data

(63) Continuation of application No. 16/724,355, filed on Dec. 22, 2019, now Pat. No. 11,499,720.

(51) Int. Cl.
| | |
|---|---|
| *F24C 15/02* | (2006.01) |
| *A21B 3/02* | (2006.01) |
| *F24C 15/08* | (2006.01) |
| *E05D 7/00* | (2006.01) |
| *E05D 7/12* | (2006.01) |
| *F24B 13/00* | (2006.01) |

(52) U.S. Cl.
CPC .............. *F24C 15/023* (2013.01); *A21B 3/02* (2013.01); *F24C 15/028* (2013.01); *F24C 15/086* (2013.01); *E05D 7/009* (2013.01); *E05D 7/123* (2013.01); *E05Y 2900/308* (2013.01); *F24B 13/004* (2013.01)

(58) Field of Classification Search
CPC .... F24C 15/023; F24C 15/086; F24C 15/028; F24C 15/08; E05Y 2900/308; A21B 3/02; E05D 7/009; E05D 7/123; F24D 13/004

USPC .......... 126/194, 304 A, 50, 305, 37 R; 16/50
See application file for complete search history.

(56) References Cited

U.S. PATENT DOCUMENTS

| | | | |
|---|---|---|---|
| 190,716 | A | 5/1877 | Hauersperger |
| 1,756,179 | A | 4/1930 | Busiek |
| RE17,917 | E | 1/1931 | Boylan |
| 1,920,044 | A | 7/1933 | Wiedemann |
| 1,931,910 | A | 10/1933 | Wells |

(Continued)

FOREIGN PATENT DOCUMENTS

| | | |
|---|---|---|
| DE | 9106422 U1 * | 5/1991 |
| DE | 102005036815 A1 * | 2/2007 |

(Continued)

OTHER PUBLICATIONS

UK Whitegoods. Oven Door Hinge Receiver Bracket. https://shop.ukwhitegoods.co.uk/018290505-smeg-oven-door-hinge-receiver-bracket. 3 pages.

(Continued)

*Primary Examiner* — Steven B McAllister
*Assistant Examiner* — Daniel E. Namay
(74) *Attorney, Agent, or Firm* — Pearne & Gordon LLP

(57) ABSTRACT

An appliance includes a hinge assembly for coupling a door to a housing or body of the appliance. The hinge assembly can include a body-mounted component, such as a body-mounted hinge or a body-mounted receiver. The body-mounted component is secured to a vertical support of the appliance. A mating component of the body-mounted hinge or body-mounted receiver is attached to the door.

18 Claims, 8 Drawing Sheets

(56) References Cited

U.S. PATENT DOCUMENTS

| | | | |
|---|---|---|---|
| 2,335,279 A * | 11/1943 | Hobson | F24C 15/08 |
| | | | 126/39 B |
| 2,775,237 A | 12/1956 | Chadwick | |
| 2,823,661 A | 2/1958 | Grannan | |
| 3,049,115 A | 8/1962 | Carnahan et al. | |
| 3,626,925 A | 12/1971 | Dalton | |
| 4,021,968 A | 5/1977 | Kendall | |
| 4,359,250 A | 11/1982 | Jenkins | |
| 4,817,240 A | 4/1989 | Sovis, Jr. et al. | |
| 7,536,752 B2 | 5/2009 | Laursen | |
| 10,082,298 B2 | 9/2018 | White | |
| 10,436,513 B2 * | 10/2019 | Chivers | F27D 5/00 |
| 11,466,864 B2 * | 10/2022 | Funk | F24C 15/086 |
| 11,499,720 B2 * | 11/2022 | Funk | F24C 15/023 |
| 2007/0251519 A1 | 11/2007 | Anikhindi | |
| 2015/0027429 A1 | 1/2015 | Nelson | |
| 2018/0216832 A1 | 8/2018 | White | |
| 2019/0040666 A1 | 2/2019 | Park | |
| 2020/0370351 A1 | 11/2020 | Lee | |
| 2020/0408420 A1 | 12/2020 | Manara | |
| 2021/0190324 A1 * | 6/2021 | Funk | F24C 15/022 |
| 2021/0190325 A1 * | 6/2021 | Funk | F24C 15/08 |
| 2021/0215342 A1 | 7/2021 | Hunt | |

FOREIGN PATENT DOCUMENTS

| | | | |
|---|---|---|---|
| DE | 202019105241 U1 * | 1/2020 | |
| EP | 0034135 A1 * | 2/1981 | |
| EP | 0149937 | 7/1985 | |
| EP | 2908056 | 8/2015 | |
| JP | 03102119 A * | 3/1990 | |
| KR | 930003479 | 6/1993 | |
| KR | 0141259 | 3/1999 | |
| KR | 100246888 | 5/2000 | |
| KR | 200253015 | 11/2001 | |
| KR | 20030056953 | 7/2003 | |
| WO | 2010034833 | 4/2010 | |
| WO | 2021005548 | 1/2021 | |

OTHER PUBLICATIONS

International Search Report and Written Opinion for PCT/US2020/065069, dated May 31, 2021, 17 pages.

* cited by examiner

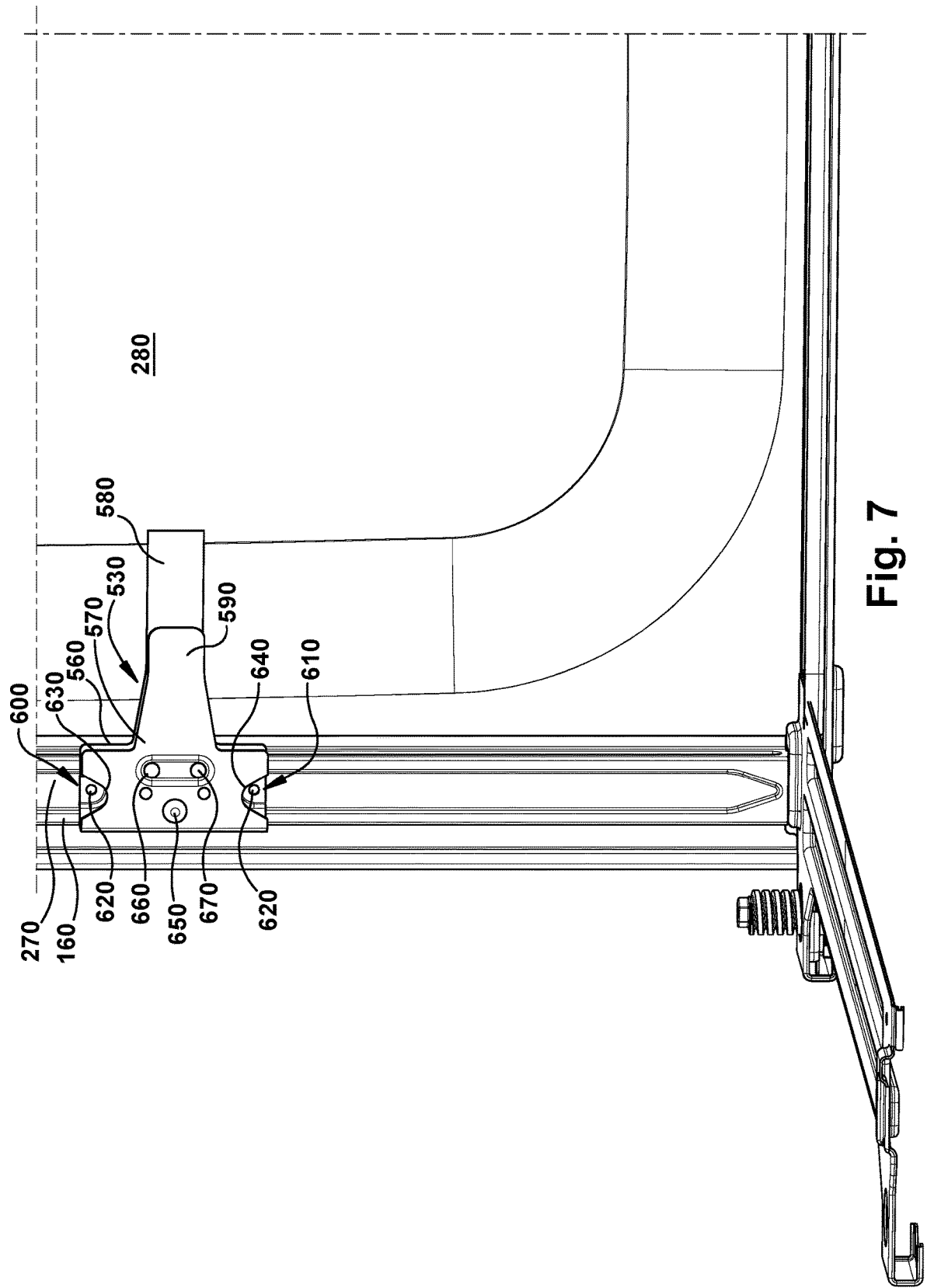

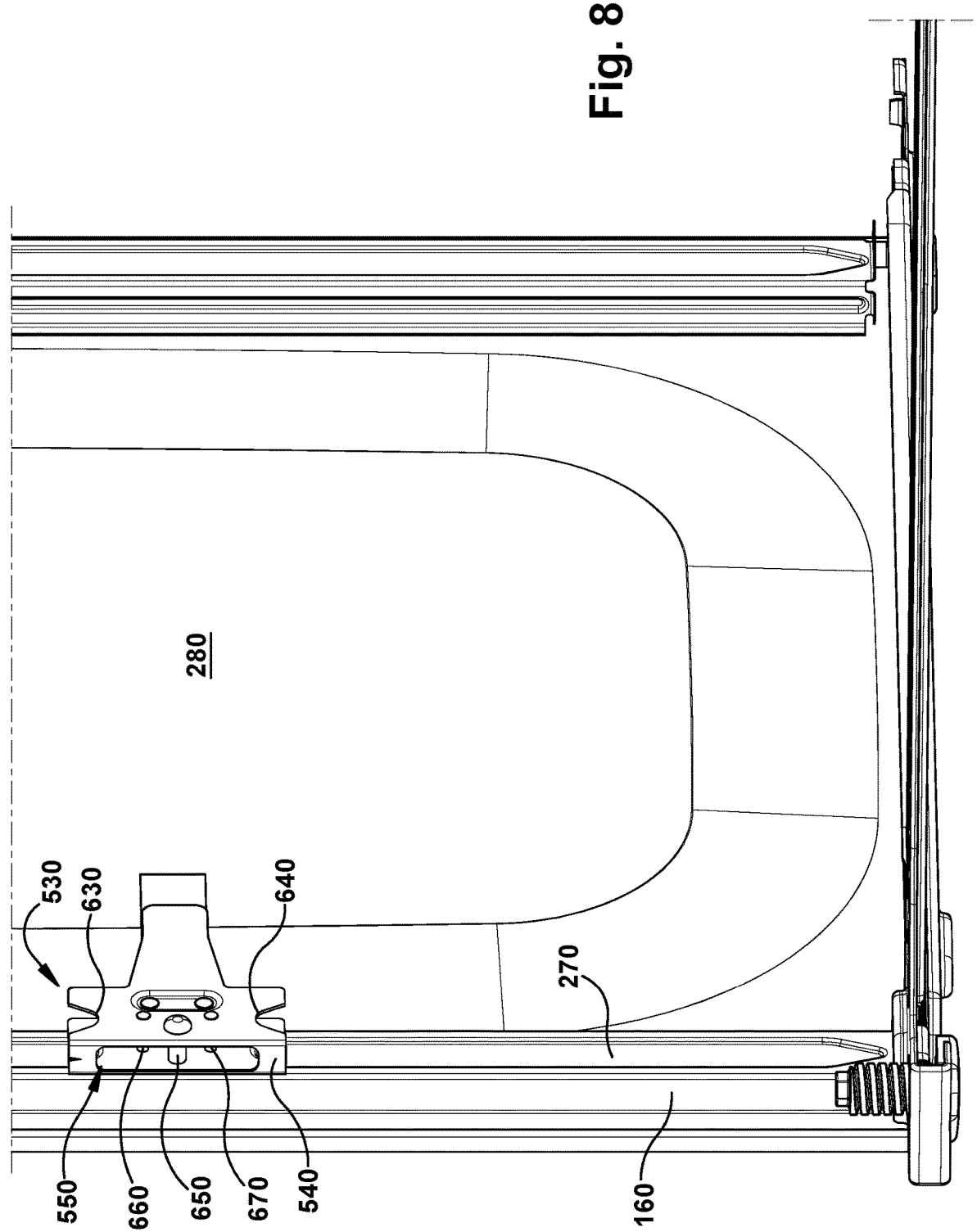

BODY-MOUNTED HINGE ASSEMBLY COMPONENT

CROSS-REFERENCE TO RELATED APPLICATIONS

This application is a continuation of U.S. patent application Ser. No. 16/724,355 filed Dec. 22, 2019, whose contents are incorporated by reference.

BACKGROUND

1. Field of the Invention

The following description relates generally to a hinge assembly for an appliance, and more specifically, to body-mounted component of a hinge assembly for an appliance.

2. Description of Related Art

Conventional household cooking appliances typically have a "uni-body" construction in which the load-carrying, structural aspects are provided by the same elements that provide the architectural or aesthetic features of the appliance. An example of such a prior art construction is illustrated in FIG. 1 in which the principal structural components of a cooking appliance, such as an oven, are illustrated. The oven 10 comprises a housing 12 assembled from a front panel 14, a rear panel 16, and a pair of side panels 18, 20. A pair of base rails 22, 24 extend between the front and rear panels 14, 16 and mount a plurality of foot assemblies 26 that support the housing 12 relative to the floor. A cooktop panel 28 for use with a plurality of conventional burners (not shown) is attached to the top of the housing 12. An oven housing 32 defining a cooking chamber 34 is sandwiched between and supported by the front panel 14 and rear panel 16.

The front panel 14, rear panel 16, and side panels 18, 20 are typically large, planar elements, and must not only serve as an aesthetically pleasing enclosure, but must also provide structural support for the oven housing 32, the cooktop panel 28, the burners, a control panel, a drawer, and other such elements typically found in a conventional household cooking range. For example, an oven door is typically coupled to the front panel 14 by a hinge assembly (not shown). The hinge assembly includes a hinge mounted to the door and a receiver attached to the front panel 14. Thus, the thin sheet metal that comprises the front panel 14 substantially carries the full load of the door 38.

SUMMARY

The following presents a simplified summary in order to provide a basic understanding of the embodiments described herein. This summary is not an extensive overview nor is it intended to identify key or critical elements. Its sole purpose is to present some concepts in a simplified form as a prelude to the more detailed description that is presented later.

According to one embodiment, a hinge assembly for an appliance is provided. The hinge assembly includes: an elongated housing comprising a base wall, a first sidewall, and a second sidewall opposite the first sidewall, the elongated housing further comprising a first end portion and a second end portion opposite the first end portion; at least one tab extending outward from and substantially perpendicular to one of the first sidewall or the second sidewall at the first end portion of the elongated housing; and at least one tab extending from the first sidewall or the second sidewall at a second end portion of the elongated housing.

According to another embodiment, an oven is provided. The oven includes: at least one vertical support column; an elongated bead provided on a face of the at least one vertical support column, the elongated bead being a recess with opposing lateral edges; and a hinge assembly comprising a hinge and a receiver, wherein one of the hinge or the receiver is secured to body of the oven such that a portion of the hinge or a portion of the receiver is positioned within the recess of and between the lateral edges of the elongated bead.

According to another embodiment, an oven is provided. The oven includes: a housing having opposed first and second side panels; first and second vertical support columns, the first vertical support column positioned at a front portion of the first side panel and the second vertical support column positioned at a front portion of the second side panel; and first and second hinge assemblies, each hinge assembly comprising a body-mounted component and a door-mounted component, wherein the body-mounted component of the first hinge assembly is directly engaged with the first vertical support column and the body-mounted component of the second hinge assembly is directly engaged with the second vertical support column, and wherein the door-mounted component of the first hinge assembly is secured to a first side of a door the door-mounted component of the second hinge assembly is secured to a second side of the door.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals can be understood to refer to the same elements, features, and structures. The relative size and depiction of these elements may be exaggerated for clarity, illustration, and convenience.

FIG. 7 is a side perspective view of a body-mounted receiver coupled to a support frame of an oven in accordance with an embodiment.

FIG. 8 is a front perspective view of a body-mounted receiver coupled to a support frame of an oven in accordance with an embodiment.

DETAILED DESCRIPTION

Figure 1:
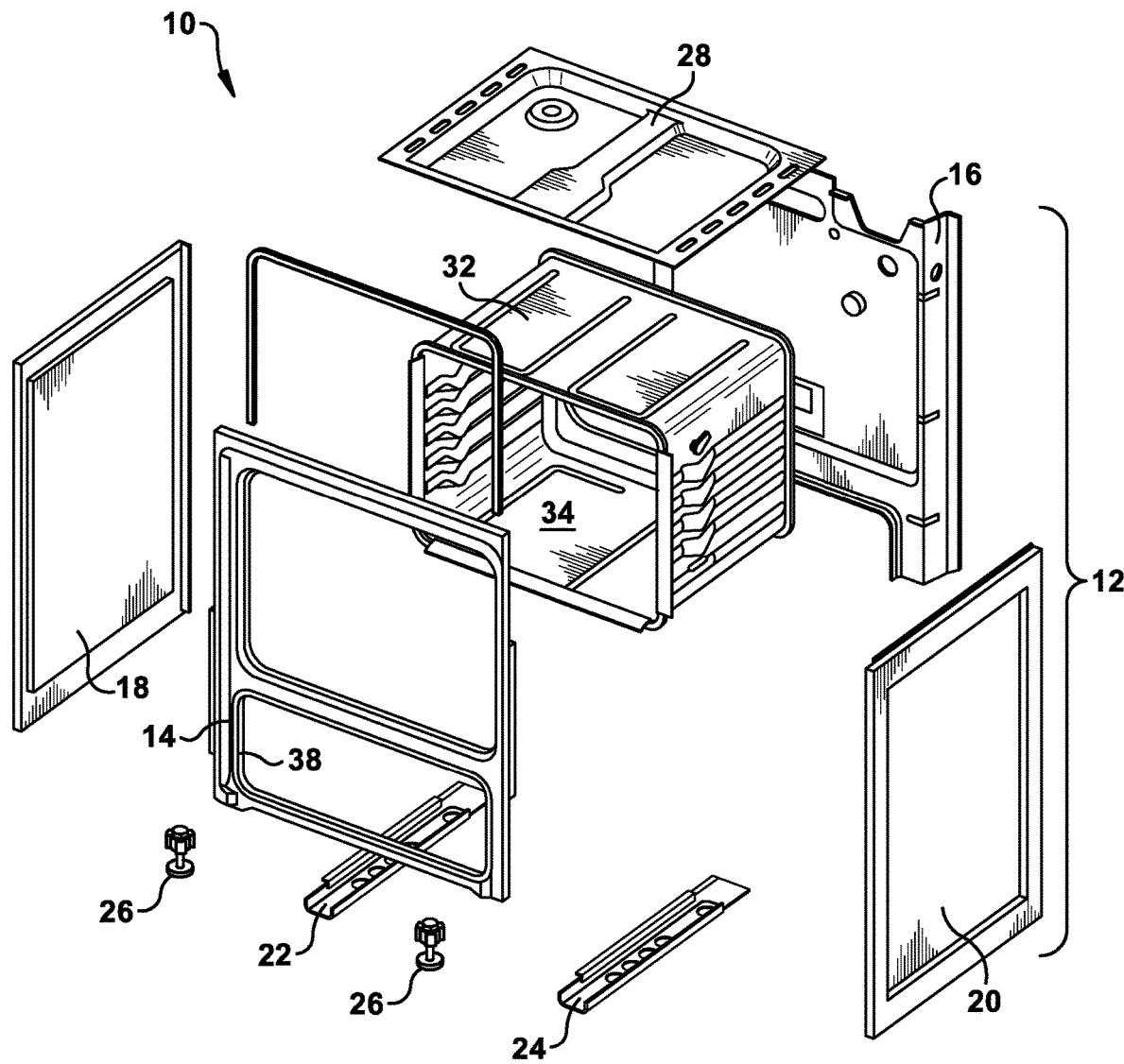
FIG. 1 illustrates an exploded view of a prior art oven housing assembly.

Example embodiments are described and illustrated herein. These illustrated examples are not intended to be a limitation on the present embodiments. For example, one or more aspects of the system can be utilized in other embodiments and other types of appliances. Example embodiments of a body-mounted component for an oven, such as a body-mounted hinge and a body-mounted receiver, will be described more fully hereinafter with reference to the accompanying drawings. Such systems may, however, be embodied in many different forms and should not be construed as limited to the embodiments set forth herein. Like, but not necessarily the same, elements in the various figures are denoted by like reference numerals for consistency. Terms such as "first," "second," "front," and "rear" are used merely to distinguish one component (or part of a component or state of a component) from another. Such terms are not intended to denote a preference or a particular orientation.

Figure 2:
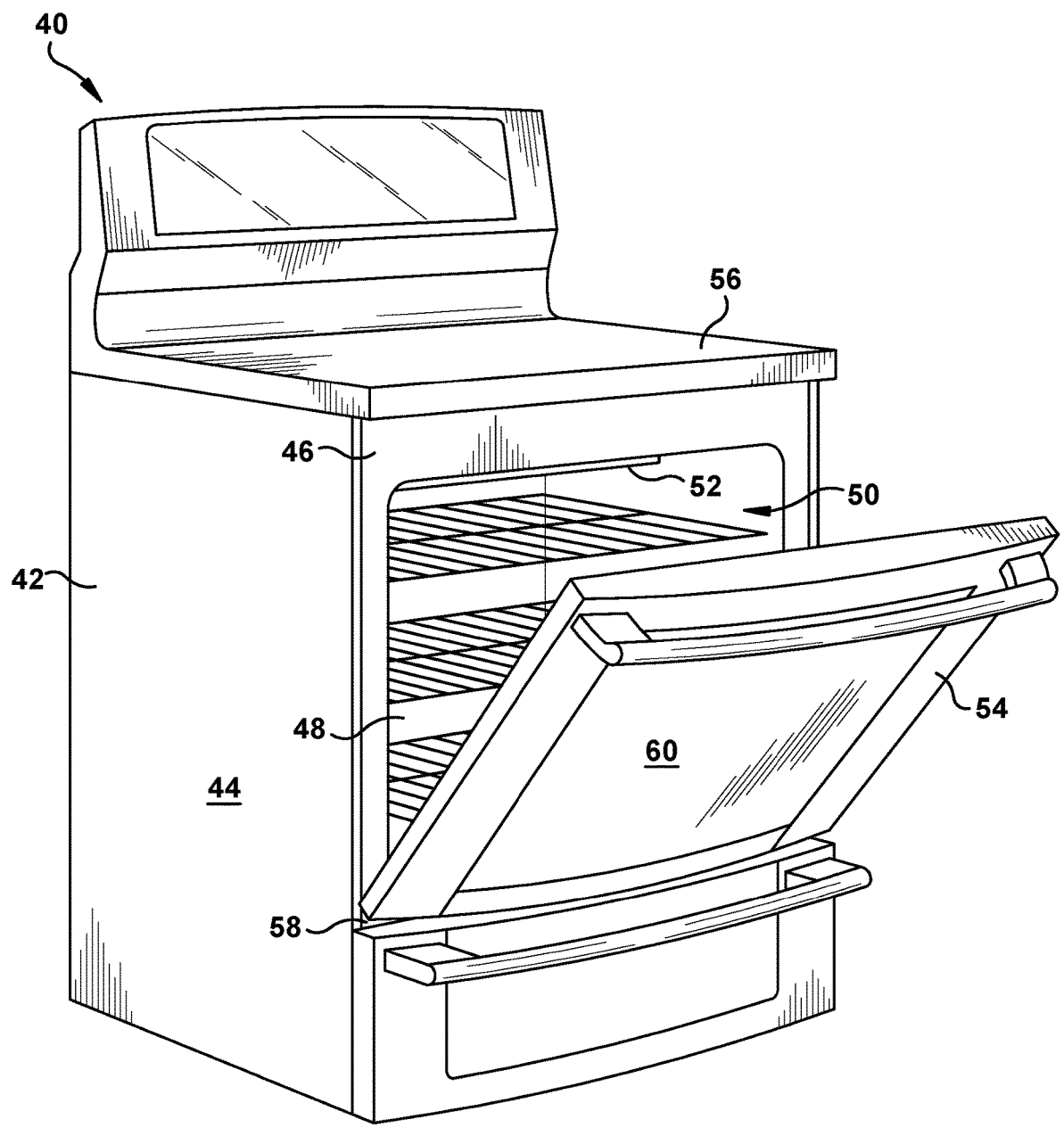
FIG. 2 is a perspective view of an oven in accordance with an embodiment.

FIG. 2 shows an example of an appliance that typically includes a hinge assembly. The type of appliance shown is a cooking appliance 40 but the hinge assembly described herein can be applicable to any device with a compartment that is closed by a door such as a dishwasher, a furnace, a rotisserie, a kiln, or the like. The appliance 40 described herein can be built-in, wall-mounted or freestanding, although other configurations could also be used. The appliance 40 includes a housing 42, which is made of first and second opposed side panels 44, a rear panel (not shown) and a front panel 46. An oven cavity 48 is enclosed by the housing 42 with front opening 50, and has a heating element 52, and a door 54 for closing the housing 42. The cooking appliance can include both an oven cavity 48 and a cooktop 56. However, alternate embodiments of the cooking appliance can include only an oven cavity 48, without the cooktop 56, and can be used in a variety of different configurations such as built-in gas ovens, etc. In addition, the appliance 40 may include more than one oven cavity 48. For example, the appliance 40 may include two oven cavities (a "double-cavity" configuration). A double-cavity configuration may be used in a built-in wall oven range, freestanding range, or other configurations. However, configurations are not limited thereto and more than two oven cavities may be included in other embodiments. For the sake of brevity, however, the embodiment of the cooking appliance shown in FIG. 2 will be used as an example to describe the oven door below.

As shown in FIG. 2, the oven door 54 is used to close the front of the oven cavity 48 from an outside area external to the appliance 40. The oven door 54 is pivotally mounted to the housing 42, e.g., to a lower frame 58 of the oven cavity 48. The door 54 can be pivoted around a horizontal pivot point between a horizontal position in which the front opening 50 is open for access by the user of the appliance, and a vertical position in which the front opening 50 is closed by the door 54. Alternatively, the oven door 54 may be mounted to a left side frame or a right side frame of the front panel 46. In this configuration, the oven door 54 can be swung around a vertical pivot point adjacent to a side section of the oven cavity 48. The door 54 includes a transparent section 60, such as a glass window in order for a user to see into the oven cavity 48 during operation of the oven without opening the door 54. As will be described in greater detail below, the appliance 40 further includes hinge assemblies coupled to the housing 42 at a front portion thereof. The hinge assemblies can be located at a front bottom portion of the appliance 40 and are spaced apart by a width that corresponds with a width of the door 54. The hinge assemblies are operable to facilitate movement of the door 54 about a horizontal axis. Accordingly, the door 54 can be rotated upward for closing and rotated downward for opening. Each hinge assembly includes a hinge and a receiver.

Either the hinge or the receiver can be mounted to a body portion of the appliance, while the mating component is mounted to the door 54, thereby allowing the door to pivot open and closed via the hinge assemblies.

Figure 3:
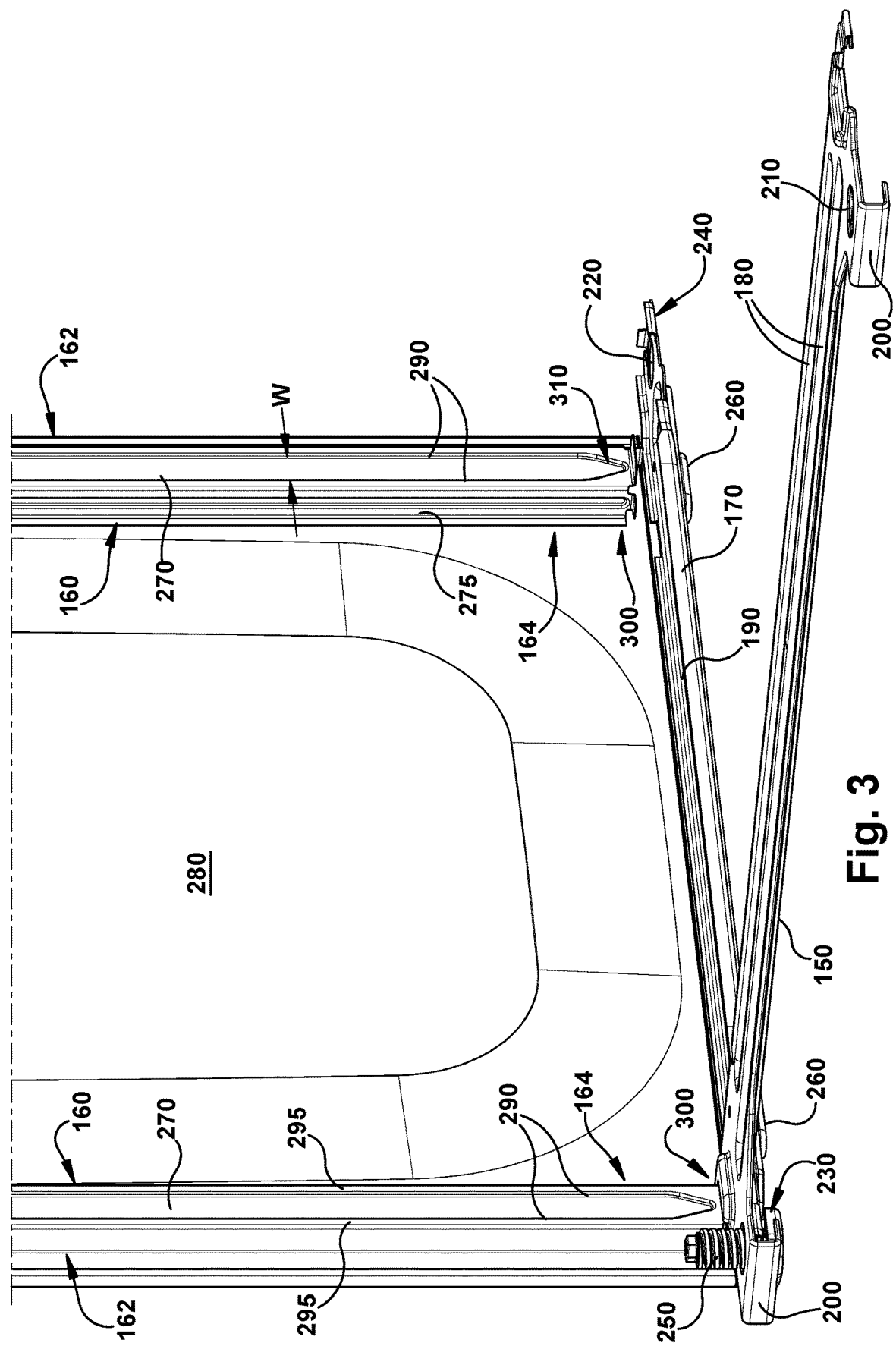
FIG. 3 is a partial perspective view of a support frame in an oven housing in accordance with an embodiment.

Turning now to FIG. 3, a portion of a support frame for an appliance housing is depicted. More specifically, FIG. 3 illustrates a front base rail 150 coupled to a vertical support column 160 and a side base rail 170. The front and side base rails 150, 170 are preferable made of metal, such as stamped sheet metal and each rail 150, 170 can include one or more longitudinally extending ribs or beads 180, 190 to provide strength to the corresponding base rails 150, 170. The front base rail 150 includes a forwardly extending flange 200 at each end. The flanges 200 each include an aperture 210 extending therethrough. The side base rail 170 includes apertures 220 extending through first and second end portions 230, 240 of the side base rail 170. The first end portion 230 of the side base rail 170 can be received within the flange 200 of the front base rail 150 such that the apertures 210 and 220 are aligned. A foot 250 can then be threaded through the apertures 210, 220 to couple the rails 150, 170 together and to provide an adjustable leveling foot for the appliance. As shown, the adjustable foot 250 is positioned forwardly of the front vertical support column 160 to mitigate forward tipping of the appliance when load from an oven door is directed down the vertical support column 160. The side base rail 170 also includes at least one downwardly extending projection or nonadjustable foot 260 that is configured to have contact with the floor or appliance support surface. While only a front base rail 150 and one side base rail 170 have been shown and described herein, it is to be appreciated that the appliance housing also includes a rear base rail with features equivalent (i.e. mirror-image) to the front base rail and a second side base rail with features equivalent (i.e. mirror-image) to the left side base rail. Thus, the oven includes first and second side base rails, a front base rail, and a rear base rail. Adjustable leveling feet extend through corresponding apertures in the base rails and are provided at each corner of the appliance. Additional contact with the floor can be made via nonadjustable feet provided in the first and second side base rails.

FIG. 3 illustrates two vertical support columns 160. The columns 160 are positioned at each corner of the appliance and can be materially integral with the side panels. For instance, the columns 160 can be formed by a metal bending operation in which opposing edge portions of each side panel are bent onto themselves and formed into substantially u-shaped channels. Alternatively, the columns can be separate components fastened with respect to the side panels. The oven can include first and second front vertical support columns and first and second rear vertical support columns. The columns 160 can include geometric features in order to improve direction and distribution of load in the appliance. For example, the columns 160 can support components, such as a body-mounted hinge or a body-mounted hinge receiver. Because the hinge-assembly components are not directly secured to the front panel, the front panel of the appliance does not need to be structural and can be merely cosmetic. Side panel 280 can be composed of a thin sheet of metal or other materials (such as plastics). While only one side panel is shown, it is to be appreciated that the appliance comprises first and second opposed side panels, a rear panel, and a front panel. As in FIG. 2, the front panel defines an oven cavity opening. The columns 160 are of a material and thickness that can withstand not only the static loads of supported components, but transient loads that may be encountered during shipping and agency testing of the appliance. At the same time, for cost- and weight-savings it is desirable to use hollow columns that are made from sheeting that is as thin as possible while still being strong enough to sustain the encountered loads.

Each vertical support column 160 can be provided with an elongated trough, rib, emboss, or bead 270 extending a substantial portion of its length. For instance, the bead 270 can extend continuously from a top portion 162 to a bottom portion 164 of the column 160. This bead 270 extends as a recess in at least one face of the column 160, such as a wall or surface facing an opposed side panel. It can be introduced via stamping or other metalworking techniques. Ideally, it is formed by metalworking rather than as an extrusion, because the process of bending the metal to form the bead 270 introduces work-hardening into the column 160, thus providing increased localized strength and buckling resistance in the vicinity of its longitudinal bends. At least one other face or wall of the vertical support column can also include a second strengthening trough, emboss, rib, or bead 275. The present example includes the second bead 275 provided in an adjacent, inner wall of the column 160; however, it is to be appreciated that the second bead can be additionally or alternatively provided in an outer wall of the column. The column 160 may comprise only three walls, such that it has a substantially c-shaped cross section, with the open side facing the adjacent side panel.

Due to the elongated bead 270, the vertical support column 160 is capable of withstanding greater loads, both static and dynamic, than a column made from an equivalent material without the bead 270. As shown, the bead 270 can be of a substantially rectangular shape and includes parallel lateral edges 290. Such a configuration provides a mechanism to easily and quickly localize, align and install attached components to the column 160, such as via brackets that are sized to be received within a recessed width of the bead 270.

Loads carried by the vertical support column 160 are principally carried at lateral portions 295 of the column adjacent to where the bends of the bead 270 have been introduced. These are generally the strongest portions of the column 160, and loads introduced via components fastened within the bead 270 will be transferred to the lateral portions 295 to be carried downward toward the ground or appliance supporting surface. Thus, weight loads will tend to be concentrated adjacent the lateral portions 295 of the column 160, rather than being uniformly distributed throughout the column 160. Prior to reaching an underlying support rail or surface on which a bottom end 300 of the column 160 rests, it is desirable to redistribute the carried loads more evenly to avoid localized-pressure points, which are more likely to result in point failures. Thus, in a lower region of the column 160 a width (W) of the bead 270 can be gradually reduced until it is completely eliminated, thereby forming a v-shaped recess 310 just above the bottom end 300 of the column 160. In this way, a uniform contour is gradually introduced into the column 160 (or at least to the surface thereof carrying the bead) adjacent to its bottom end 300. This will have the effect of redistributing weight loads from the lateral portions 295 uniformly about the bottom end 300 of the column 160 (or again, at least through its face bearing the bead), rather than driving those loads into an adjacent base rail concentrated at the lateral portions 295 of the column 160. In essence, while the bead structure 270 introduces greater strength and buckling resistance into the column 160 along its length, it also has the effect of concentrating loads adjacent the fortified, lateral portions 295 of the column. The narrowing feature or v-shaped recess 310 redistributes those loads uniformly about the column 160 or its face before they are delivered to the corresponding base rail.

Figure 4:
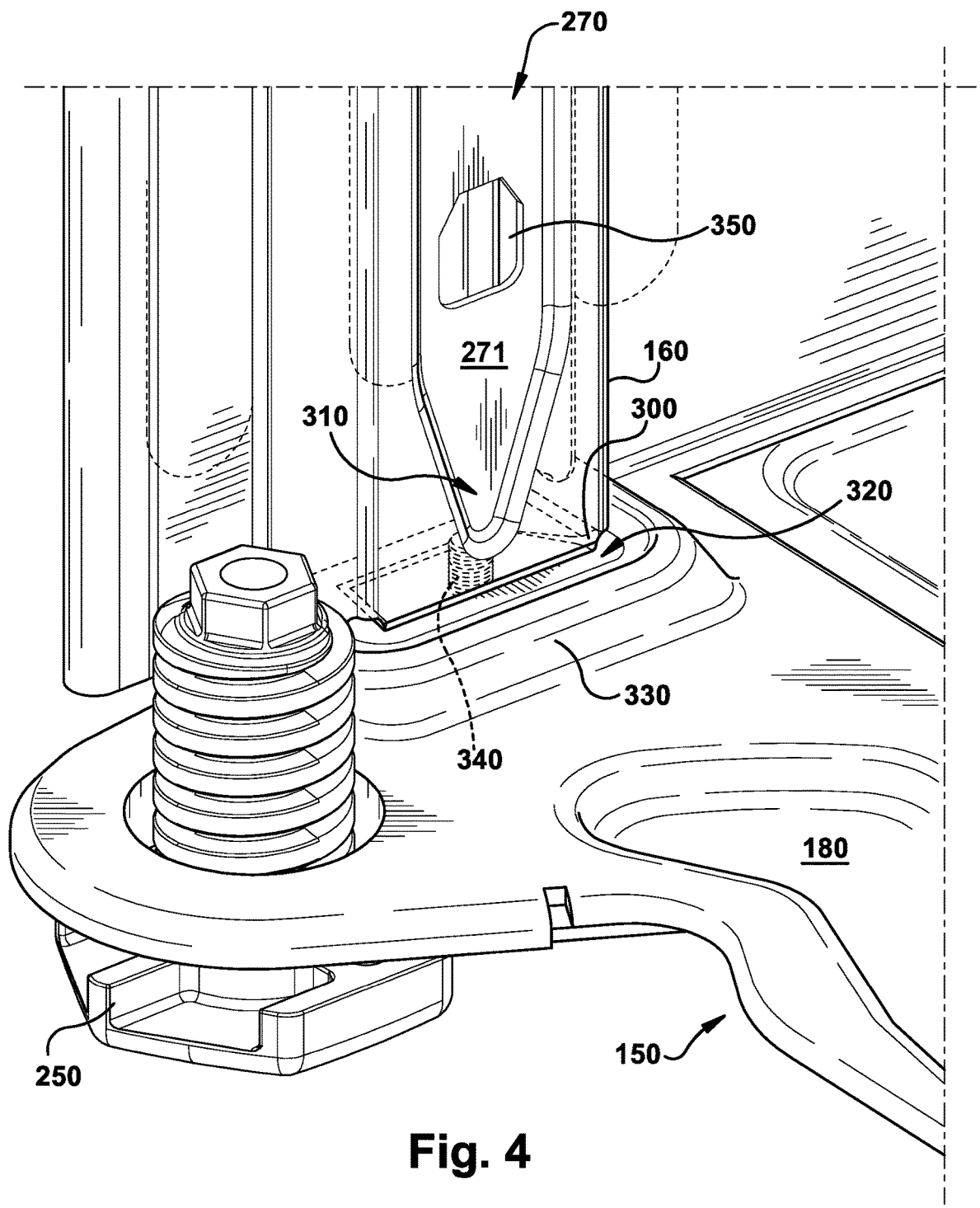
FIG. 4 is a perspective view of a front lower corner of the support frame of FIG. 3 in accordance with an embodiment.

While is known to form structural columns for supporting loads via stamping or metal bending from the decorative side walls of an appliance. The walls themselves are too thin to provide structural support. But a column formed as bends from a terminal edge of the side wall and onto itself can be sufficiently robust to provide structural support to the appliance. The features described herein, such as the bead 270, can be equally incorporated into a column that is formed integrally with a decorative side wall via metal bending. Turning now to FIG. 4, another feature that mitigates buckling at a base of the vertical support column 160 is a raised or embossed pocket 320 provided in the base rail, such as the front or rear base rail 150, into which the column 160 delivers its loads. The pocket 320 preferably has a shape complementary to that of the bottom end 300 of the column 160, with an embossed perimeter 330. This aids with assembly whether manually or by automation. More importantly, it also allows lateral loads on the columns 160 (e.g. experienced in transport or agency testing) to be transferred to the base rail 150 not through the fasteners, such as bolt 340, affixing the column 160 to the base rail 150, but instead through the bottom end 300 of the column 160 abutting the raised embossment 330 of the pocket 320. This can be important especially when using thinner material for the base rail 150 (e.g. to save weight and cost), because lateral loads transferred via fasteners 340 in sheer may tend to abrade and widen the opening in the base rail 150 through which the fastener 340 extends, thus loosening the fastener 340. Using the described structure, the fastener 340 serves merely to affix the relative positions of the column 160 and base rail 150, and contributes minimally if at all to supporting lateral loads in sheer.

A locating hole 350 can be provided in a wall 271 of the bead 270 near the bottom end 300 of the column 160, or elsewhere along its length. The locating hole 350 may prove useful in assembly by providing a fixed, reproducible location where a robot can grasp the part, or from which automated machinery can gauge the location of remote features on, or the orientation of, the column 160 during assembly. Such an opening 350 also will ensure that loads are concentrated along the fortified lateral portions of the column surface, because loads cannot travel through the empty space in the column where the hole 250 has been provided.

Figure 5:
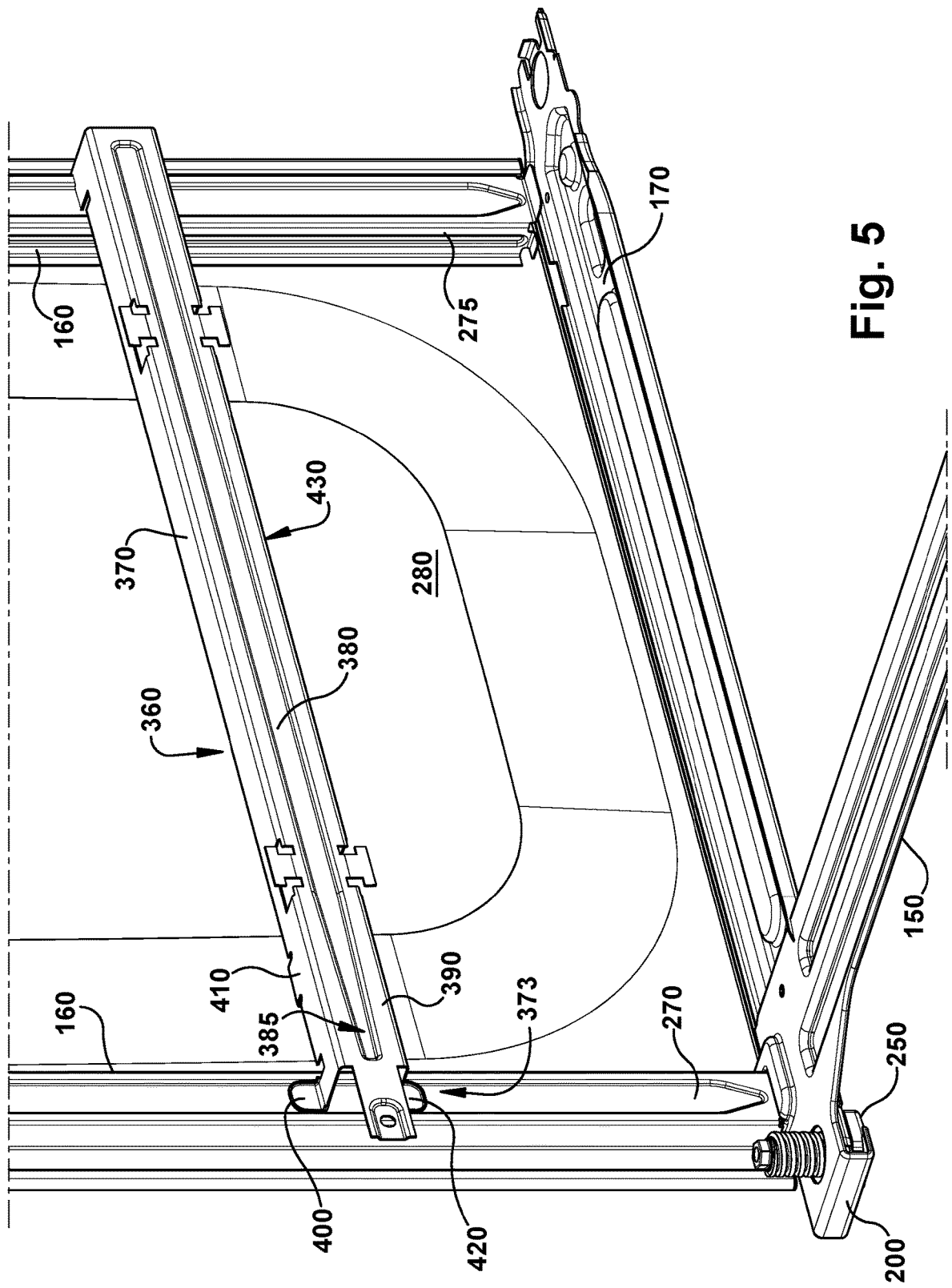
FIG. 5 is a front perspective view of a body-mounted hinge coupled to a support frame of an oven in accordance with an embodiment.
Figure 6:
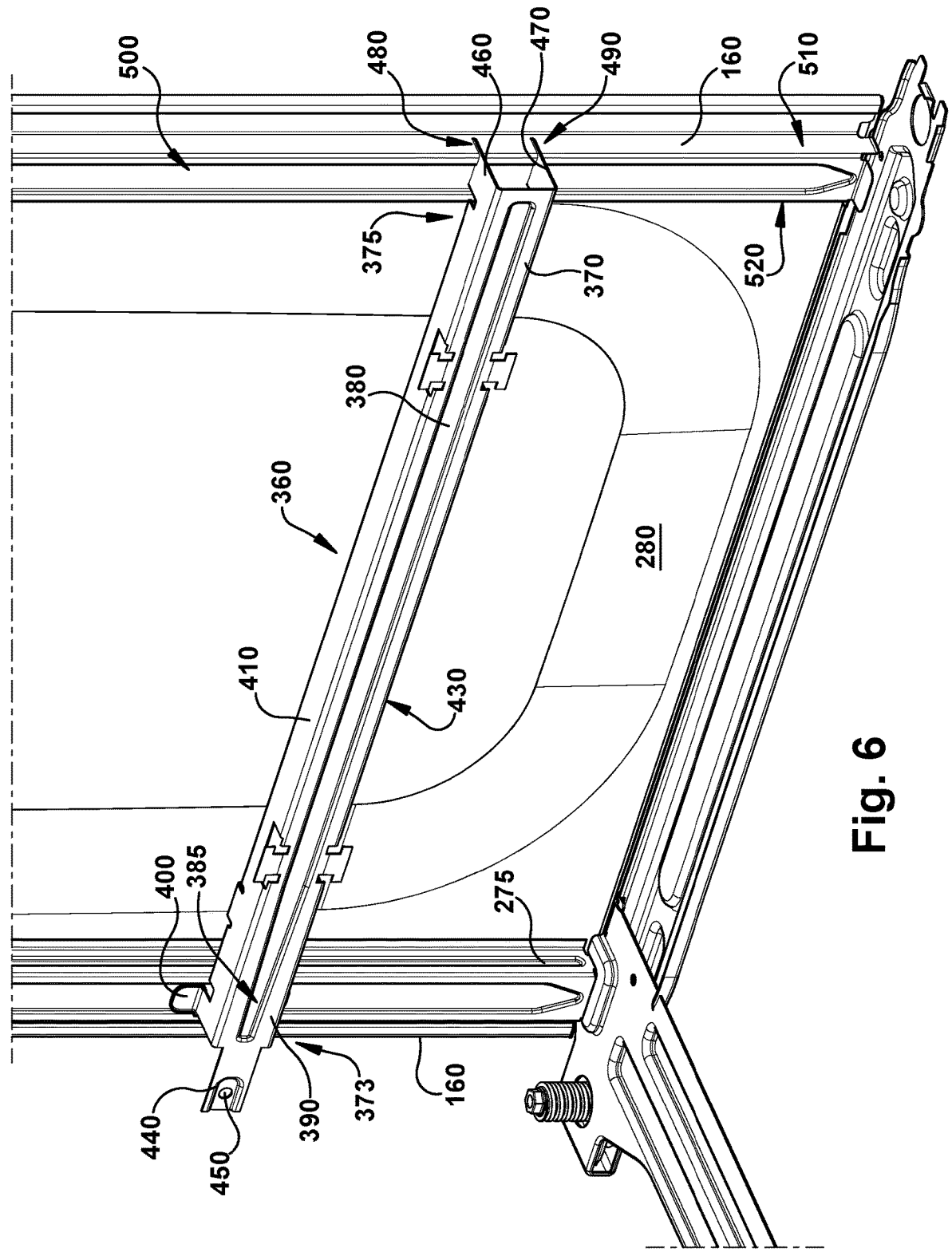
FIG. 6 is a rear perspective view of a body-mounted hinge coupled to a support frame of an oven in accordance with an embodiment.

Turning now to FIGS. 5 and 6, an example of a body-mounted hinge 390 coupled to the appliance support frame is shown. For purposes of simplicity and clarity, only a housing 370 of the body-mounted hinge is shown. The hinge housing 370 is an elongated channel having a generally c-shaped cross section and is configured to accommodate conventional hinge components therein, such as a counter-balancing compression spring and roller members. The hinge housing 370 is mounted horizontally within the oven and includes at least one strengthening rib 380 extending longitudinally within a base portion or wall 390 of the hinge housing 370. Similar to the bead 270 in the vertical support column 160, the at least one strengthening rib 380 includes a narrowed end portion 385 towards a front portion of the appliance where the load on the hinge 360 is the greatest.

The hinge housing 370 includes a first end portion 373 and an opposing second end portion 375. The first end portion 373 is located near a front portion of the appliance and adjacent a front vertical support column 160. The first end portion 373 includes at least one tab that engages the front vertical support column 160. The hinge housing 370 includes a first tab 400 extending outwardly and substantially perpendicularly from a first sidewall 410 of the hinge housing 370, and a second tab 420 extending outwardly and substantially perpendicularly from a second sidewall 430 of that housing 370. More specifically, the first tab 400 extends upward towards a top portion of the appliance and the second tab 420 extends in an opposite direction, downward towards the base rail 150. The first and second tabs 400, 420 are of a width that corresponds to the width W of the bead 270 in the vertical support column 160. Thus, the first and second tabs 400, 420 can be press fit within the bead 270 between its lateral edges 290. In other words, the first and second tabs 400, 420 can be held in position within the bead 270 via an interference fit between outer edges of the tabs 400, 420 and the lateral edges 290 of the bead 270. Fasteners can be used to secure the hinge housing 370 to the columns 160 and/or sidewall 430. The first end portion 373 of the hinge housing 370 further includes a flange 440 having an aperture 450 therein. The flange 440 can extend from the base wall 390 and is used for attachment to a claw or hanger assembly (not shown). The claw or hanger is used to couple the hinge 360 to a receptacle positioned in a door of the oven. Thus, a portion of the load of the door is transferred from the hinge housing 370 to the vertical support column 160 via the connection between the tabs 400, 420 and the bead 270. The load is then carried through the bead 270 downward toward the ground or appliance supporting surface, as described above.

The second end portion 375 of the hinge housing 370 is located near a rear portion of the appliance. The second end portion 375 also includes one or more tabs or extensions that engage an adjacent rear vertical support column 160. Specifically, a first rear tab 460 extends from the first sidewall 410 of the hinge housing 370 and a second rear tab 470 extends from the second sidewall 430 of the hinge housing 370. The first tab 460 is substantially parallel to the second tab 470. Moreover, the first tab 460 is substantially parallel to the second sidewall 430 and likewise, the second tab 470 is substantially parallel of the first sidewall 410. The adjacent rear vertical support column 160 includes a first narrow aperture or slot 480 and a second narrow aperture or slot 490 extending through a front surface 500 of the column 160 and through a portion of an outer sidewall 510 and an inner sidewall 520 of the column 160. A distance between the first and second rear tabs 460, 470 corresponds with a distance between the first and second slots 480, 490 such that the first and second rear tabs 460, 470 can be received within the first and second slots 480, 490, as shown in FIG. 6. Thus, the hinge 360 can be fully supported by the front and rear vertical support columns 160 without the use of fasteners.

FIGS. 7 and 8 illustrate an embodiment in which a body-mounted receiver 530 is coupled to a vertical support column of an appliance support frame. The body-mounted receiver 530 is substantially u-shaped in cross-section and can be a stamped metal member or the like. The receiver 530 includes a base 540 defining a mounting slot or opening 550 therein and two opposing sidewalls 560, 570. The first receiver sidewall 560 includes a first flange 580 that extends inwardly towards a back wall of the appliance. The second receiver sidewall 570 includes a second flange 590 that also extends towards a back wall of the appliance. The first flange 580 can be longer than the second flange 590 to resist any torsion in the front column due to the weight of the door and the spring in the hinge that helps close and balance the door during use. The first receiver sidewall 560 includes at least one embossment that corresponds with the bead 270 of the vertical support column 160. Specifically, the receiver 530 includes a first embossment 600 at a top portion of the first receiver sidewall 560 and a second embossment 610 at a bottom portion of the first receiver sidewall 560. Each of the first embossment 600 and second embossment 610 includes an aperture 620 therein. The aperture 620 is configured to receive a fastener to secure the receiver 530 within the bead 270 of the vertical support column 160. The second receiver sidewall 570 includes a first notch 630 and a second notch 640, each opposite a corresponding one of the first and second embossments 600, 610 in order to provide access to the apertures 620 and thus, any fasteners provided therethrough.

At least one pin, rivet, fastener or other mounting member 650 spans a recess between the first and second sidewalls 560, 570. Second and/or third mounting members 660, 670 can also be provided within the recess in order to receive a claw of a hinge. When the claw is inserted into the opening 550, one or more of mounting pins 650, 660, 670 is received within a corresponding slot of the claw in order to pivotally secure the hinge, in this case a door-mounted hinge, to the receiver 630.

The first and second embossments 600, 610 can be of a width that corresponds to the width W of the bead 270. Thus, the first and second embossments 600, 610 fit within the bead 270 between lateral edges 290. Thus, a portion of the load of the door is transferred from the receiver 530 to the vertical support column 160 via the connection between the embossments 600, 610 and the bead 270. The load is then carried through the bead 270 downward toward the front base rail 150 or appliance supporting surface via one or more feet 250, 260, as described above.

It is to be appreciated that while a specific hinge housing and receiver have been illustrated and described herein, any suitable body-mounted component, such as a body-mounted hinge or body-mounted receiver of any configuration can be employed and still fall within the scope of the present invention. A portion of the body-mounted component is coupled to at least one vertical support column, and sometimes to two vertical support columns, in order to drive down a load of the oven door into an adjacent base rail. At least one of the vertical support columns can include an elongated bead to provide strength for the column and directed control of the load distribution.

Although embodiments described herein are made with reference to example embodiments, it should be appreciated by those skilled in the art that various modifications are well within the scope and spirit of this disclosure. Therefore, the scope of the example embodiments is not limited herein. The disclosure is intended to include all such modifications and alterations disclosed herein or ascertainable herefrom by persons of ordinary skill in the art without undue experimentation. It will be appreciated that a hinge system and appliance body construction configured in accordance with the examples shown herein can be used for a wide variety of other appliances such as clothes washers and dryers, dishwashers and the like.

What is claimed is:

1. A household appliance comprising:
a first vertical support column having an elongated bead extending along a length thereof, said elongated bead being provided as a recess within a surface of the first vertical support column; and
a base rail defining a first pocket therein;
a bottom end of said first vertical support column abutting the first pocket such the first vertical support column are delivered to said base rail via abutment between the bottom end of the first vertical support column and the first pocket.

2. The household appliance of claim 1, said first pocket comprising a raised perimeter embossment in an upper surface of the base rail, said raised perimeter embossment being complementary in shape to the bottom end of said vertical support column, wherein lateral loads carried by the first vertical support column are delivered to said base rail via abutment between the bottom end of the first vertical support column and the raised perimeter embossment of the first pocket.

3. The household appliance of claim 2, further comprising a fastener affixing said first vertical support column to said base rail, wherein said fastener does not substantially transmit either vertical or horizontal loads between said first vertical support column and said base rail.

4. The household appliance of claim 3, said fastener comprising a bolt extending upward from beneath the base rail and into the bottom of said first vertical support column.

5. The household appliance of claim 1, further comprising a second vertical support column having an elongated bead extending along a length thereof and provided as a recess within a surface thereof; said base rail defining a second pocket therein; a bottom end of said second vertical support column abutting the second pocket such that vertical loads carried by the second vertical support column are delivered to said base rail via abutment between the bottom end of the second vertical support column and the second pocket.

6. The household appliance of claim 5, said first and second pockets comprising respective raised perimeter embossments in an upper surface of the base rail, which are complementary in shape to the bottom ends of said first and second vertical support columns, respectively; wherein lateral loads carried by the first and second vertical support columns are delivered to said base rail via abutment between the bottom ends of the first and second vertical support columns, respectively, and the raised perimeter embossments of the first and second pockets.

7. The household appliance of claim 5, the first and second vertical support columns being affixed to the base rail via respective fasteners that substantially do not undergo sheer as a result of lateral loads between the base rail and the respective vertical support columns.

8. The household appliance of claim 1, said base rail being a front base rail of the appliance, said front base rail further comprising a first forward extending flange at a first end thereof adjacent to said first pocket, and a first aperture in the first forward extending flange; wherein a foot is received through the first aperture such that the foot is disposed forward of the first vertical support column.

9. The household appliance of claim 8, further comprising a side base rail extending substantially perpendicular to the front base rail, the side base rail comprising a second aperture at a front end thereof; wherein the first and second apertures in the respective front and side base rails are aligned and said foot extends through both said first and second apertures.

10. The household appliance of claim 1, said vertical support column being formed integrally with a decorative side wall of the household appliance via metal bending.

11. The household appliance of claim 1, further comprising a hinge assembly comprising a hinge and a receiver;
wherein one of the hinge or the receiver is secured to the oven such that a portion of the hinge or a portion of the receiver is positioned within the recess of the elongated bead.

12. The household appliance of claim 11, wherein the portion of the hinge positioned within the bead is a tab extending from a housing of the hinge.

13. The household appliance of claim 12, wherein a surface of the tab contacts a surface of the recess.

14. The oven of claim 12, wherein a width of the tab corresponds with a recessed width of the elongated bead.

15. The household appliance of claim 1, said first vertical support column being a front vertical support column, the appliance further comprising a rear vertical support column, and wherein a first end portion of a hinge is coupled to the front vertical support column and a second end portion of the hinge is coupled to the rear vertical support column.

16. A household appliance comprising:
a housing having opposed first and second decorative side panels;
first and second vertical support columns formed integrally in the respective decorative side panels via metal bending;
and a front base rail comprising first and second pockets having respective embossed perimeter walls formed in an upper surface of the base rail at opposing first and second ends thereof;
the respective bottom ends of the first and second vertical support columns being received in the first and second pockets, respectively;
wherein both vertical and lateral loads are transmitted from each of the first and second vertical support columns directly to the base rail via abutment with the respective pockets and without any substantial proportion of said loads being transmitted via intermediate fasteners.

17. The household appliance of claim 16, wherein each of the first and second vertical support columns has an elongated bead recessed within a surface thereof.

18. The household appliance of claim 17, wherein a body-mounted component of a first hinge assembly is engaged with the elongated bead of the first vertical support column and a body-mounted component of a second hinge assembly is engaged with a recessed portion of the elongated bead of the second vertical support column, wherein loads on the body-mounted components of the first and second hinge assemblies are carried by the first and second vertical support columns, respectively.

* * * * *